United States Patent
Kaneko

[11] Patent Number: 5,839,681
[45] Date of Patent: *Nov. 24, 1998

[54] FISHLINE GUIDE MECHANISM FOR SPINNING REEL

[75] Inventor: Kyoichi Kaneko, Tokyo, Japan

[73] Assignee: Daiwa Seiko, Tokyo, Japan

[ * ] Notice: The term of this patent shall not extend beyond the expiration date of Pat. No. 5,547,139.

[21] Appl. No.: 707,823

[22] Filed: Sep. 4, 1996

Related U.S. Application Data

[60] Continuation of Ser. No. 550,766, Oct. 31, 1995, abandoned, which is a division of Ser. No. 503,880, Jul. 18, 1995, Pat. No. 5,547,139, which is a continuation of Ser. No. 136,695, Oct. 15, 1993, abandoned.

[30] Foreign Application Priority Data

Oct. 16, 1992 [JP] Japan ......................... 4-78162
Dec. 10, 1992 [JP] Japan ....................... 4-090555 U

[51] Int. Cl.$^6$ .................................................... A01K 89/01
[52] U.S. Cl. ............................................................ 242/231
[58] Field of Search .................................. 242/230, 231, 242/232, 233

[56] References Cited

U.S. PATENT DOCUMENTS 2,728,534 12/1955 Wallace .
2,797,055 6/1957 McDonald ............................. 242/232
4,238,085 12/1980 Jansson et al. ........................ 242/232
4,562,976 1/1986 Ban ....................................... 242/231
4,705,228 11/1987 Maruyama et al. .................... 242/233
5,193,762 3/1993 Takeuchi ............................... 242/232
5,547,139 8/1996 Kaneko ................................. 242/231
5,560,561 10/1996 Henriksson ........................... 242/231

FOREIGN PATENT DOCUMENTS 779192 4/1960 France ................................... 242/232
1299685 6/1962 France ................................... 242/230
30-5881 4/1955 Japan .
49-30149 8/1974 Japan ................................... 242/232
2-83759 12/1983 Japan .
58-194680 12/1983 Japan .
4-77771 7/1992 Japan .
4-77772 7/1992 Japan .
94-4769 3/1994 Rep. of Korea .
244530 5/1947 Switzerland ........................... 242/231

Primary Examiner—Katherine Matecki
Attorney, Agent, or Firm—Longacre & White

[57] ABSTRACT

A fishline guide mechanism for a spinning reel, in which a fishline is guided within a narrow groove formed in a rotatable guide roller which may be supported on a bail support member so as to be tiltable about its rotational axis depending on a direction of force applied to the fishline. The line roller is configured to restrict rolling and sliding of the fishline in the lateral direction (along the roller axis) when the fishline is guided by the roller, to thereby reduce twisting and tangling of the fishline.

11 Claims, 7 Drawing Sheets

FISHLINE GUIDE MECHANISM FOR SPINNING REEL

This is a continuation of application Ser. No. 08/550,766, filed Oct. 31, 1995, abandoned, which is a divisional application of Ser. No. 08/503,880, filed Jul. 18, 1995, now U.S. Pat. No. 5,547,139 which was a continuation application of Ser. No. 08/136,695, filed Oct. 15, 1993, which was abandoned upon the filing hereof.

BACKGROUND OF THE INVENTION

The present invention relates to an improvement for a fishline guide mechanism of a spinning reel.

There has been recognized a problem in a fishline guide mechanism provided in a spinning reel that a fishline guide roller provided in a bail support member applies an irregular force to a fishline during the course of winding operation, which results in the twist of the fishline, un-uniform winding of the fishline on the spool, the permanent wave phenomenon on the fishline, and the possibility of the cut of the fishline, since the winding direction is varied depending on the diameter of the fishline wound on the spool. FIGS. 11a through 11c illustrate a conventional roller 'a', and exemplify line twist that is caused by movement of the fishline 'b' on the outer periphery of the roller 'a'. More specifically, when fishline 'b' is laid in an inclined manner with respect to the roller axis 'c' (see FIG. 11a), rotation of the roller 'a' acts to shift the fishline 'b' away from the central area of reduced diameter (in the direction of the arrow of FIG. 11b). Since tension is applied to the fishline 'b', the fishline 'b' tends to move to its original position of FIG. 11a during rotation. Movement of the fishline 'b' back to its original position shown in FIG. 11c causes rolling and twisting in the fishline 'b'(FIG. 11c). To solve this problem, Japanese Utility Model Unexamined Publication Sho. 58-19468 discloses an automatic alignment system in which a rotatable fishline guide roller is supported on a bail support member so as to be tiltable about its rotational center.

However, the automatic alignment system for the guide roller suffers from another problem in that a clearance between a peripheral one end of the fishline guide roller and an annular projection of the support member is increased when the fishline guide roller is tilted, so that the fishline is likely to enter and clog into the increased clearance. At the other peripheral end of the fishline guide roller, the fishline is likely to come off from a guide portion of the guide roller and, ride on the other portion outward from the guide portion.

SUMMARY OF THE INVENTION

In order to solve the problems found in the prior art, the present invention provides a fishline guide mechanism in which a fishline is guided on a guide surface of a guide roller which is supported on a bail support member so as to prevent twisting of the fishline by prohibiting unnecessary rolling of the fishline on and along the fishline guide surface during the winding operation.

The preferred guide mechanism comprises a guide roller wherein fishline is received in and guided by a fishing guide surface during the winding operation. The fishline guide main surface is formed as a groove or stepped recess provided along the circumference of the guide roller with auxiliary surfaces provided adjacent the guide main surface to direct the fishline into the groove or stepped recess so that the fishline immediately falls within the fishline guide main surface. With this arrangement, the guide roller can prevent the fishline from rolling and sliding on and over the guide surface by virtue of the retaining edge which adjoins the fishline guide main surface to the auxiliary surface. Thus, the fishline is free from twisting, becoming unwieldy, tangling and being accidentally cut.

In the preferred embodiment of the invention, the fishline guide main surface formed as a groove or stepped recess may be located at a substantially central location along the axial direction of the guide roller, or may be located at a biased position nearer to one of the ends of the guide roller.

In order to further solve the problems found in the prior art, the present invention provides a fishline guide mechanism in which a fishline is guided on a guide surface of a rotatable guide roller which is supported on a bail support member so as to be tiltable about its rotational center depending on a direction of force applied to the fishline, the guide surface having lateral ends, and the support member having a pair of annular projections opposite to each other and defining inner surfaces opposite to the guide roller. The fishline guide mechanism is characterized in that: a first distance defined between the lateral ends of the guide surface is greater than a second distance defined between opposing distal ends of the annular projections. A clearance may be formed between one of the inner surfaces of the guide projections and corresponding one of the lateral ends of the guide surface as long as it is maintained at substantially the same constant amount even when the guide roller is tilted relative to the support member.

Preferably, each of the inner surfaces of the projections is formed as a part of a circle whose center is coincident with the rotational and tilting center of the guide roller. Each of the inner surfaces of the projections may be of step-wise. The guide surface may include a fishline guide main portion in the form of groove and auxiliary portion located at both side of the main portion, through which the fishline is guided into the main portion.

The present invention further provides a fishline guide mechanism in which a fishline is guided on a guide surface of a rotatable guide roller which is supported on a bail support member so as to be tiltable about its rotational center depending on a direction of force applied to the fishline, the. guide surface having lateral ends, and the support member having a pair of annular projections opposite to each other and defining inner surfaces opposite to the guide roller, characterized in that: a first distance defined between the lateral ends of the guide surface is greater than a second distance defined between opposing distal ends of the annular projections; and a clearance defined between one of the inner surfaces of the guide projections and corresponding one of the lateral ends of the guide surface is decreased as the guide roller is tilted to move the one lateral end of the guide surface nearer to the distal end of the annular projection. The one lateral end of the guide surface may be brought into contact with corresponding one of the inner surfaces of the guide projections to close the clearance.

The present invention further provides a fishline guide mechanism for a fishing reel, which includes: a bail support member having a spherical inner surface; and a guide roller formed with a fishline guide surface and supported by the spherical inner surface at lateral ends of the fishline guide surface so as to be rotatable and tiltable with respect to the bail support member. The spherical inner surface is defined by a pair of annular projections provided on the bail support member and deviated from each other at a first distance over the fishline guide surface. The first distance is smaller than a second distance defined between the lateral ends of the fishline guide surface. Preferably, a low-friction coating is applied on at least one of the spherical inner surface and a portion of the guide roller which is bought into contact with the spherical surface.

DETAILED DESCRIPTION OF THE PREFERRED EMBODIMENTS

Preferred embodiments of the present invention will now be described in detail with reference to the drawings attached hereto.

Figure 1:
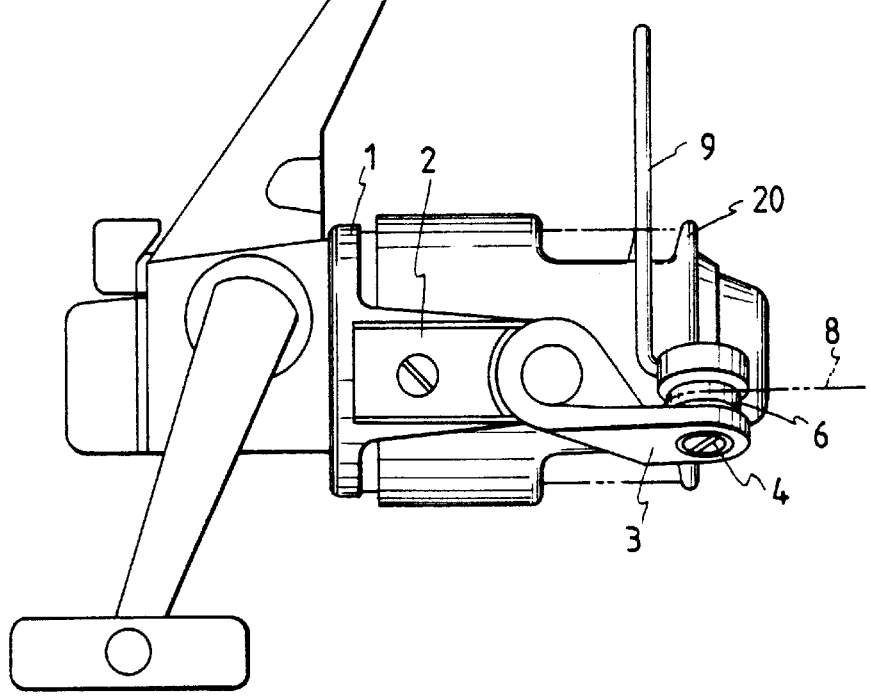
FIG. 1 is a front view showing a spinning reel for fishing into which a fishline guide mechanism according to an embodiment of the present invention is incorporated.
Figure 2:
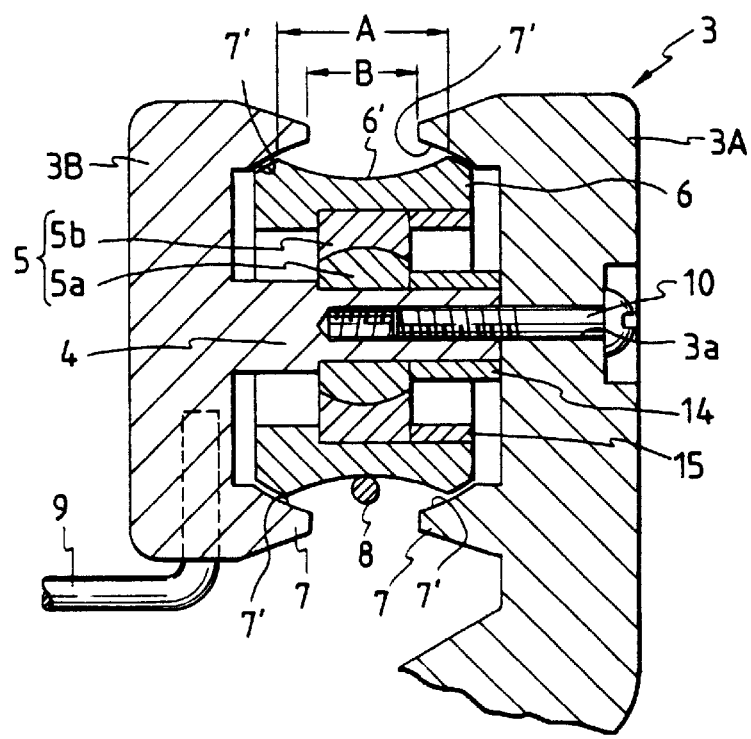
FIG. 2 is a cross-sectional view showing major parts of the fishline guide mechanism.
Figure 3:
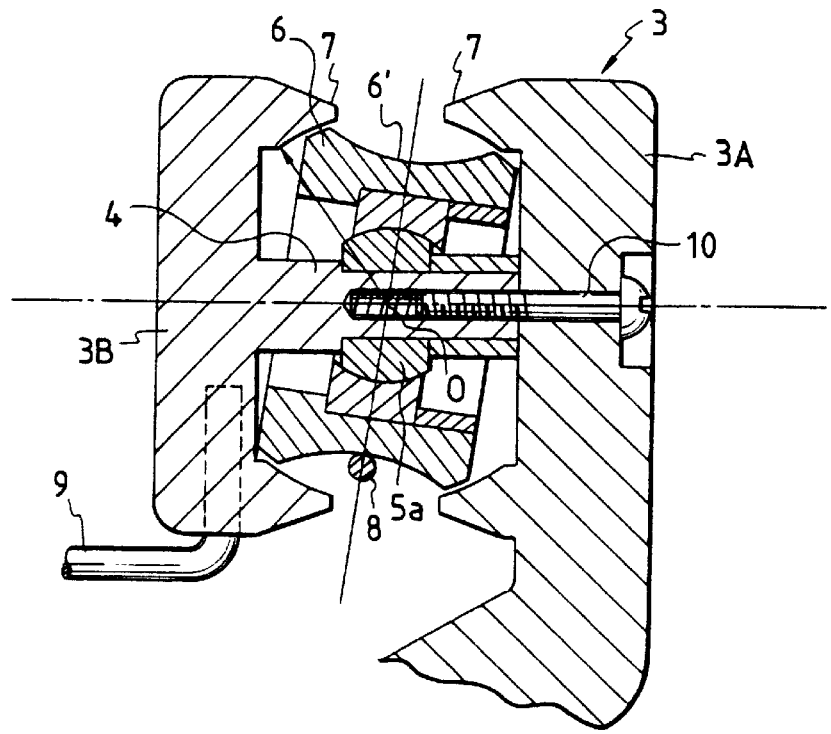
FIG. 3 is a cross-sectional view showing the major parts in a state that a guide roller is tilted.

FIGS. 1 to 3 show a fishline guide mechanism for a spinning reel according to a first embodiment of the present invention. In the spinning reel, a bail support member 3 having a bail 9 is pivotably supported on a support arm 2 provided on a rotor 1. The bail supported member 3 is made up of a first support member 3A pivotably supported on the support arm 2 and a second support member 3B to which the bail 9 is fixed. The first support member 3A has a through hole 3a whereas the second support member 3B has a support shaft 4. A mounting screw 10 passing through the hole 3a is threadingly engaged with the support shaft 4 to secure the second support member 3B to the first support member 3A. An inner race member 5a of a spherical surface bearing 5 and a collar 14 are fitted on the support shaft 4. The collar 14 and a step of the support shaft 4 retain the inner race member 5a in place. A fishline guide roller 6 with a fishline guide portion 6' formed into a substantially arcuate concave configuration is fitted on an outer race member 5b of the spherical surface bearing 5 and retained in place by a collar 15. Thus, the fishline guide roller 6 is rotatably supported and rocked on the support shaft 4 through the spherical surface bearing 5. In this embodiment, the fishline guide portion 6' is U-shaped, but it may be other concave configuration in cross-section, such as a V-shape or the like. Each of the first and second bail support members 3A and 3B is formed with an annular projection 7 in such a manner that a distance A defined by lateral terminal ends of the fishline guide portion 6' is greater than a distance B defined by inner opposing ends of projections 7 when the first and second members 3A and 3B are coupled together. Preferably, as best shown in FIG. 3, the dimensional relationship between the distance A and the distance B is so selected that the lateral end of the fishline guide portion 6' is prevented from being moved beyond the inner end of the projection 7 even when the guide roller 6 is tilted maximum. Further, each of the projections 7 defines an inner circumferential surface 7' a distance from which to the corresponding lateral end of the fishline guide surface 6' is maintained at the substantially the same small constant value even when the guide roller 6 is rotated and/or rocked on the support shaft 4. Preferably, the inner circumferential surface 7' is so formed as to be a part of a circle whose center is coincident with a rotating and rocking center O of the fishline guide roller 6 as best shown in FIG. 3.

Since the fishline guide mechanism according to the embodiment is constructed as mentioned above, it is possible to surely prevent the lateral end of the fishline guide portion 6' from entering into a gap between the opposing ends of the collars 7 of the bail support member 3 and also to maintain the distance between the end of the fishline guide portion 6' and the inner circumferential surface 7' of the collar 7 at the substantially the same small constant value, even when the guide roller 6 is tilted due to the influence of the tension of the fishline 8 as shown in FIG. 3. Thus, this arrangement surely prevent the fishline 8 from coming off from the fishline guide portion 6', entering or clogging into the clearance between the support member 3 and the roller 6, tangling onto the support shaft 4, raising out of the fishline guide portion 6' onto the support member 3.

Figure 4:
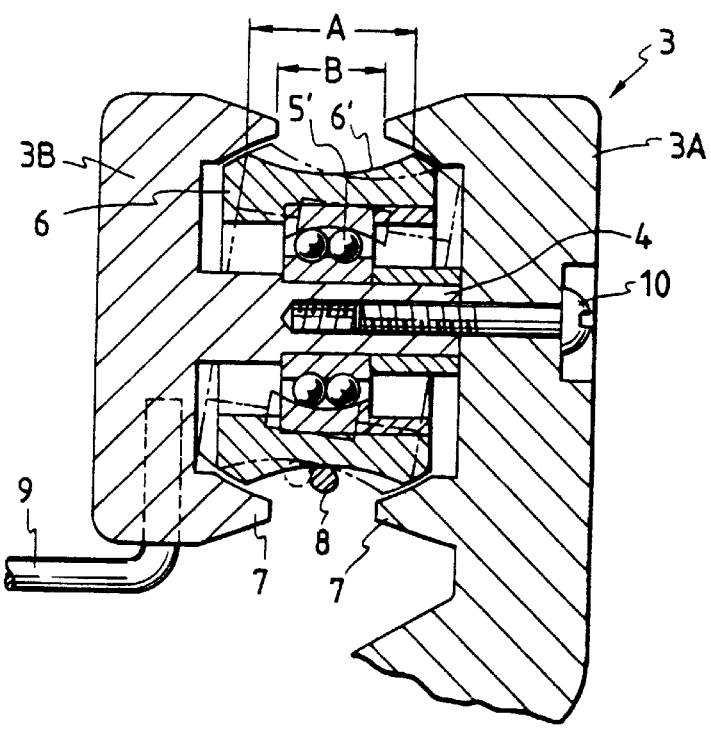
FIG. 4 is a cross-sectional view showing major parts of a fishline guide mechanism according to a second embodiment of the invention.
Figure 5:
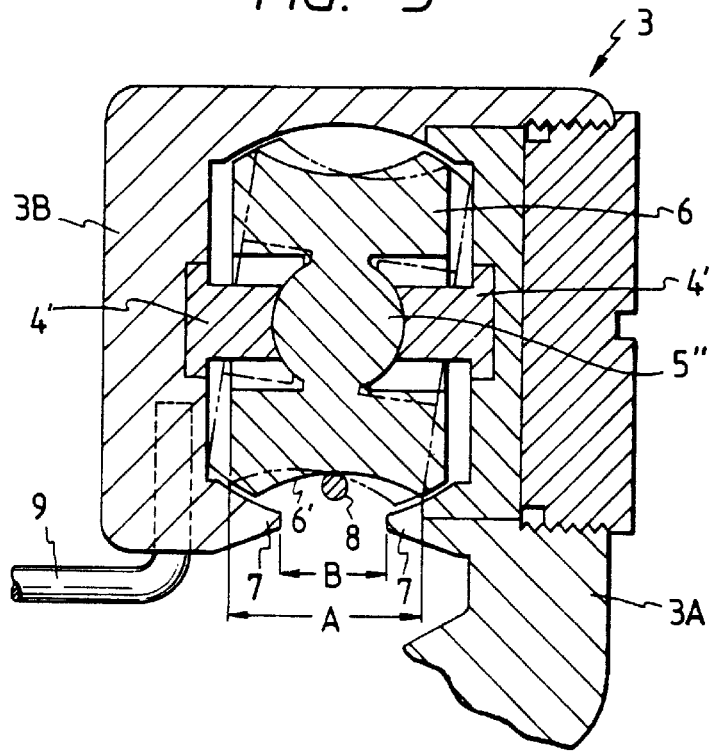
FIG. 5 is a cross-sectional view showing major parts of a fishline guide mechanism according to a third embodiment of the invention.

FIG. 4 shows another embodiment in which the fishline guide roller 6 is rotatably supported on an automatic aligning ball-bearing 5'. FIG. 5 shows yet another embodiment in which a ball portion 5" is formed in the fishline guide roller at its central portion and the ball portion 5" is supported by center pins 4' axially projecting from the first and second support members 3A and 3B, respectively. In this embodiment shown in FIG. 5, the first and second support members 3A and 3B are coupled together using a portion of the second support member 3B, which is located radially outward relative to the guide roller 6.

Figure 6:
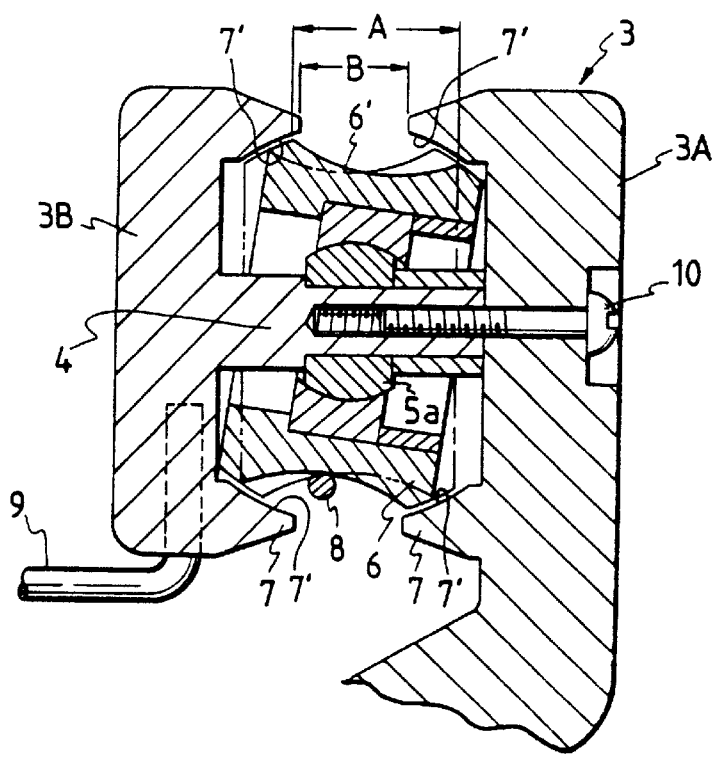
FIG. 6 is a cross-sectional view showing major parts of a fishline guide mechanism according to a fourth embodiment of the invention.

FIG. 6 shows still another embodiment in which the inner circumferential surface 7' is so designed as to gradually decrease a distance therefrom to the end of the fishline guide portion 6' as the end of the guide surface 6' is moved inward. In this embodiment, when the fishline guide roller is tilted, a distance between the inner circumferential surface of the annular projection 7 and the one of the ends of the fishline guide portion 6' is decreased while a distance between the inner circumferential surface of the annular projection 7 and the other of the ends of the fishline guide portion 6' is increased. It may be appreciated that the one of the ends of the fishline guide portion 6' is brought into contact with the corresponding annular projection when tilted further 7.

Figure 7:
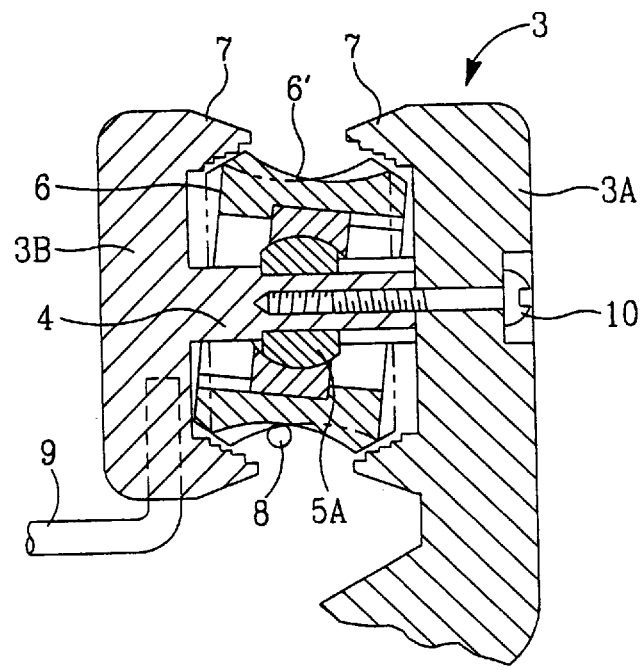
FIG. 7 is a cross-sectional view showing major parts of a fishline guide mechanism according to a fifth embodiment of the invention.

FIG. 7 shows further another embodiment in which the surface 7' is formed in a step-wise manner.

Figure 8A:
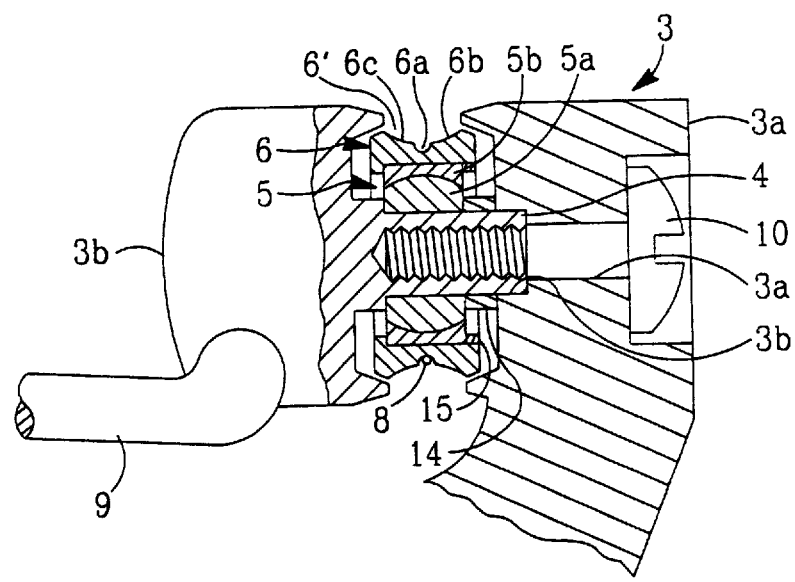
FIGS. 8a–8c and 9 are cross-sectional views showing modifications for the first embodiment.
Figure 8B:
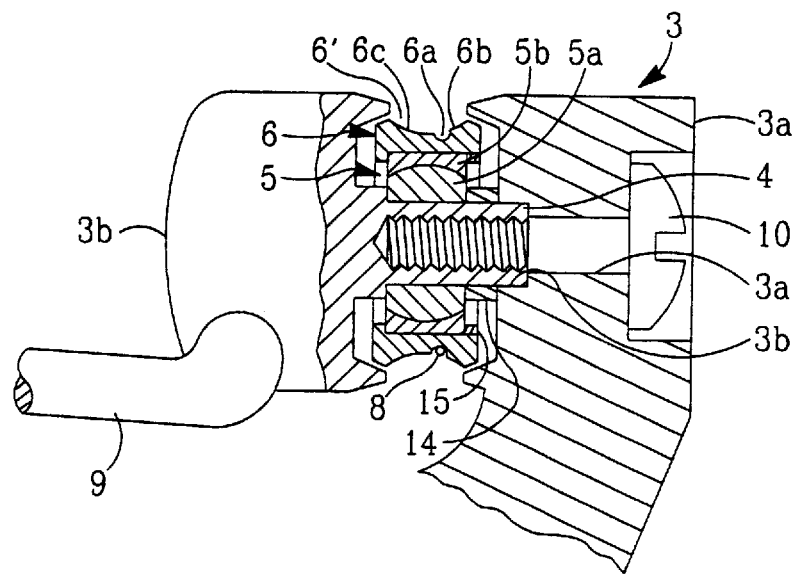
Figure 8C:
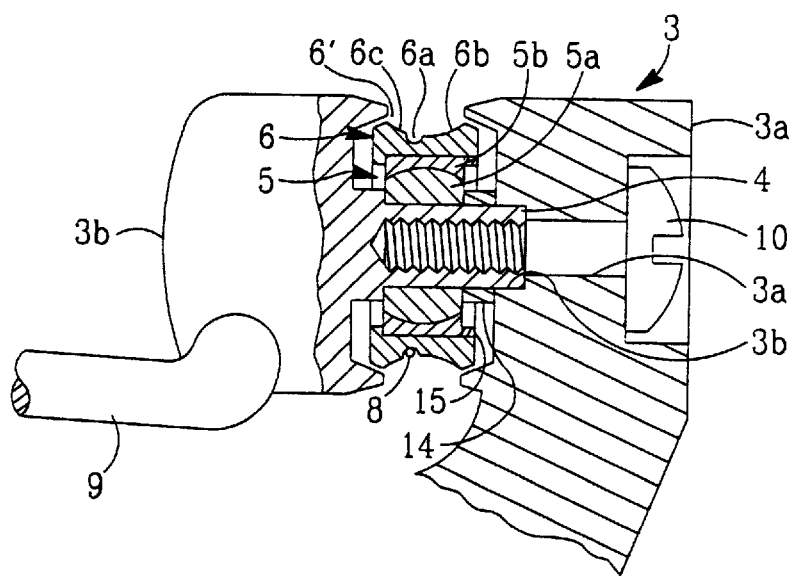
Figure 9:
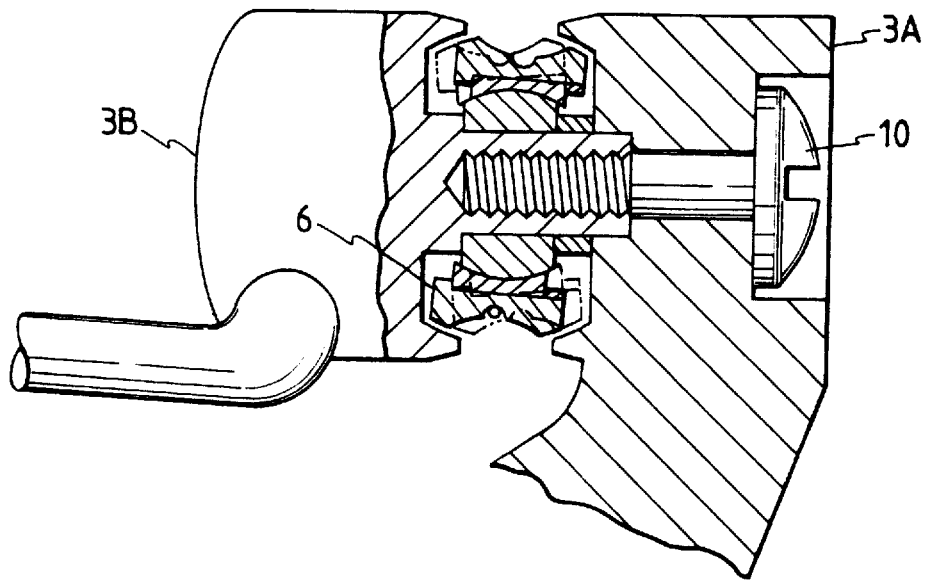

FIGS. 8(a) and 9 show a modification for the first embodiment shown in FIGS. 1–3, in which a radially extending or U-shaped groove in cross-section is formed in the fishline guide roller 6 at its central portion so that the fishline guide surface 6' is made up of a fishline guide main portion 6a and auxiliary portions 6b and 6c located at both sides of the main portion 6a. When the bail support member 3 is pivoted relative to the support arm 2 from a fishline unwinding position to a fishline winding position, the fishline 8 is led to the guide roller 6. The fishline led to the guide roller 6 is quickly displaced to within the fishline guide main portion 6a by the virtue of the auxiliary portions 6b and 6c. The fishline guide main portion 6a in the form of a relatively narrow groove can prevent the fishline 8 from rolling and sliding on and over the fishline guide portion 6' in the lateral direction when the fishline 8 is guided by the roller 6 by virtue of the fact that auxillary portion(s) 6b, 6c adjoin the fishline guide portion 6a at a retaining edge. Thus, the fishline 8 is free from twisting, becoming unwiedly, tangling and being accidentally cut. In addition, the support shaft 4 of the second support member 3B is fitted in a large diameter portion 3b of the through hole 3a. In this modification, the main portion 6a in the form of the groove is located at substantially central portion of the fishline guide portion 6'. However, the main portion 6a may be located at a biased position nearer to one of the ends of the fishline guide portion 6' than the other as shown in FIGS. 8b and 8c. Also, this modification may be applied to other embodiments shown in FIGS. 4–7.

Figure 10:
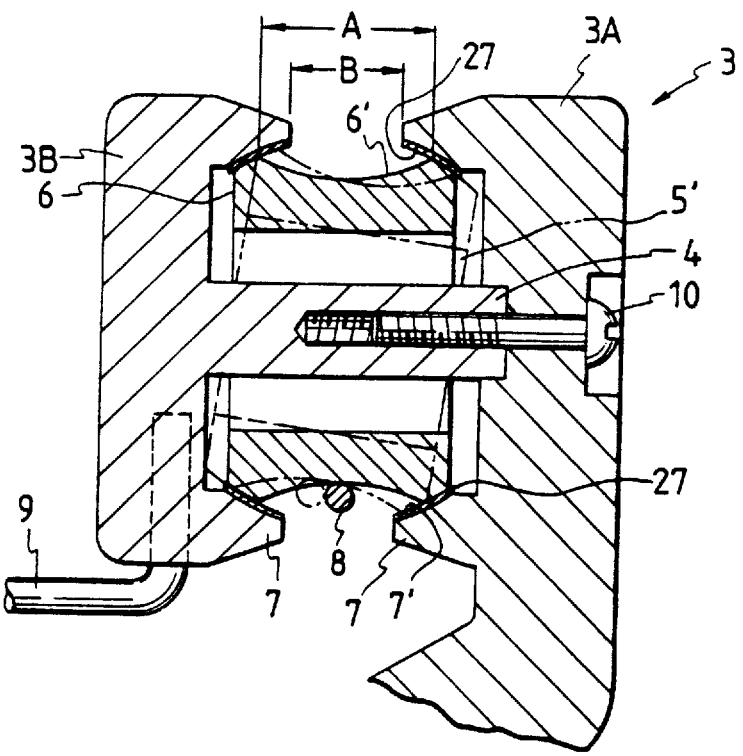
FIG. 10 is a cross-sectional view showing another modification for the first embodiment.
Figure 11A:
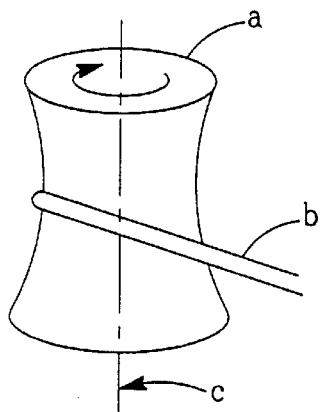
FIGS. 11a–11c illustrate fishline twist caused on a conventional line roller.
Figure 11B:
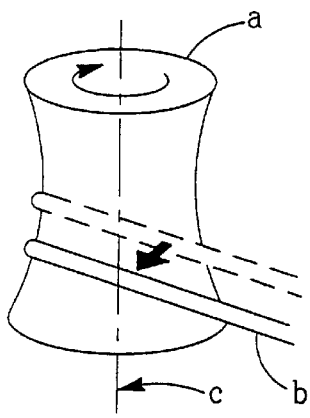
Figure 11C:
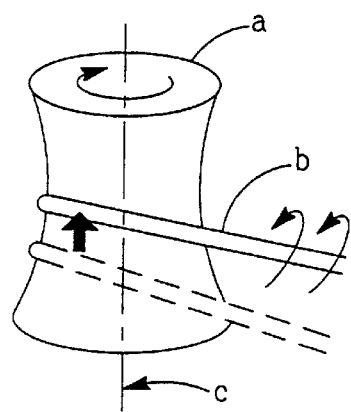

FIG. 10 shows another modification for the first embodiment shown in FIG. 1–3, in which a clearance is not formed between the inner circumferential surface 7' of the projection 7 and the corresponding lateral end of the fishline guide surface 6'. That is, the lateral end of the fishline guide surface 6' is brought into contact with the inner circumferential surface 7' of the projection 7 at all times. Preferably, a low-friction coating 27 is applied to both of or at least one of the inner circumferential surface 7' and a portion of the guide roller 6 at and in the vicinity of the lateral end, which portion is brought into contact with the inner circumferential surface. Owing to this construction, it is possible to dispense with a bearing-type support system provided on the support shaft 4 in the former-embodiments since the inner circumferential surface 7' rotatably and tiltably can support the guide roller 6 within a space defined in the bail support member 3. This modification may be also applied to other embodiments shown in FIGS. 4–7.

According to the present invention, in an automatic alignment system for a spinning reel where a guide roller is arranged to be tiltable about a center of its rotation, a distance defined between lateral ends of a guide roller fishline guide surface is made greater than a distance between opposing ends of annular projections respectively formed in first and second parts of a bail support member, and further a clearance between an inner surface of each annular projection and the corresponding lateral end of the fishline guide surface is made constant even when the guide roller is tilted. Therefore, a fishline is surely prevented from coming off from the fishline guide surface, entering or clogging into the clearance between the bail support member and the guide roller, tangling on components of the guide mechanism, and raising out of the fishline guide surface onto the support member. Thus, the arrangement of the present invention can ensure the smooth. fishline winding operation of the spinning reel.

What is claimed is:

1. A fishline guide mechanism for guiding a fishline, said fishline guide mechanism comprising:

a bail support member; and a guide roller supported by said bail support member and rotatable about an axis, said guide roller having a fishline guide main portion in the form of an annular groove for receiving a fishline therein, and a fishline auxiliary portion adjacent to said fishline guide main portion for guiding said fishline to fall within said annular groove, said auxiliary portion adjoining said annular groove at a retaining edge extending around the entire circumference of said guide roller, wherein said annular groove is asymmetrically located nearer to a first axial end of said guide roller than a second opposite axial end of said guide roller.

2. The fishline guide mechanism according to claim 1, wherein said auxiliary portion is located between said annular groove and said second axial end of said guide roller.

3. The fishline guide mechanism according to claim 2, wherein said auxiliary portion comprises a slanted surface which slants toward said annular groove.

4. The fishline guide mechanism according to claim 1, wherein said retaining edge defines a first minimal diameter of said auxiliary portion, said first minimal diameter being larger than a second minimal diameter of said annular groove.

5. The fishline guide mechanism according to claim 1, wherein said annular groove defines at least one retaining wall extending substantially in a radial direction with respect to said axis.

6. The fishline guide mechanism according to claim 5, wherein said at least one retaining wall extends to said retaining edge.

7. The fishline guide mechanism according to claim 1, wherein said guide roller is formed as a single integral unitary member.

8. The fishline guide mechanism according to claim 1, wherein said guide roller moves along a circular path direction during a winding operation, said retaining edge being downstream of said annular groove with respect to said circular path.

9. The fishline guide mechanism according to claim 8, wherein said auxiliary portion is located upstream of said annular groove with respect to said circular path.

10. The fishline guide mechanism according to claim 1, wherein said annular groove defines a line-receiving width and said auxiliary portion defines a line-guiding width extending in a direction of said axis, said line-receiving width being smaller in dimension than said line-guiding width, said line-receiving groove of said annular groove being sized to rolling and twisting of the fishline during a winding operation of said fishline guide mechanism.

11. The fishline guide mechanism according to claim 1, wherein said annular groove is arcuate in shape.

* * * * *